(12) United States Patent
Lim

(10) Patent No.: US 11,485,178 B2
(45) Date of Patent: Nov. 1, 2022

(54) HYBRID RUN-FLAT FOR MILITARY VEHICLE

(71) Applicant: KOREA RUNFLAT COMPANY CO., LTD, Gyeongsangnam-do (KR)

(72) Inventor: Hak Jin Lim, Changwon (KR)

(73) Assignee: KOREA RUNFLAT COMPANY CO., LTD, Changwon (KR)

( * ) Notice: Subject to any disclaimer, the term of this patent is extended or adjusted under 35 U.S.C. 154(b) by 52 days.

(21) Appl. No.: 17/075,391

(22) Filed: Oct. 20, 2020

(65) Prior Publication Data

US 2021/0138847 A1 May 13, 2021

(30) Foreign Application Priority Data

Nov. 7, 2019 (KR) ........................ 10-2019-0141703

(51) Int. Cl.
*B60C 17/04* (2006.01)
*B60C 17/00* (2006.01)
*B60C 17/06* (2006.01)
*B60C 17/10* (2006.01)

(52) U.S. Cl.
CPC ............ *B60C 17/009* (2013.01); *B60C 17/04* (2013.01); *B60C 17/047* (2013.01); *B60C 17/06* (2013.01); *B60C 17/10* (2013.01); *B60C 2017/063* (2013.01)

(58) Field of Classification Search
CPC ....... B60C 17/00; B60C 17/009; B60C 17/04; B60C 17/047; B60C 17/06; B60C 17/08; B60C 17/10; B60C 17/103; B60C 2017/063; B60C 2200/06; B60C 2200/065; B60C 2200/08

USPC ......................................................... 152/520
See application file for complete search history.

(56) References Cited

U.S. PATENT DOCUMENTS

2009/0095395 A1 * 4/2009 Khatib ................. B60C 15/028
152/520

FOREIGN PATENT DOCUMENTS

| DE | 102014225107 A1 | * | 6/2016 | ............. B60C 17/10 |
| JP | 2002166712 A | * | 6/2002 | |
| JP | 2010285104 A | * | 12/2010 | |
| KR | 10-2009-0047711 A | | 5/2009 | |
| KR | 101457545 B1 | * | 11/2014 | |

OTHER PUBLICATIONS

Lee Woo Hyuk, KR-101457545-B1, machine translation. (Year: 2014).*

(Continued)

*Primary Examiner* — Robert C Dye
*Assistant Examiner* — Sedef E Paquette
(74) *Attorney, Agent, or Firm* — Maschoff Brennan

(57) ABSTRACT

The present invention relates to a hybrid run-flat having a buffering structure for a military vehicle, and more particularly, to a hybrid run-flat having a buffering structure for a military vehicle wherein a buffer member famed of a material different from the run-flat is provided on an outer circumferential surface of the run-flat of the military vehicle to enable a driving due to the buffer member even when a tire punctures, in which a groove for a lubricant is formed on an outer circumferential surface of the buffer member, and a buffer space as an empty space is famed therein, so that the impact relief effect is increased.

2 Claims, 5 Drawing Sheets

(56) References Cited

OTHER PUBLICATIONS

Seiji Yamashita, JP-2002166712-A, machine translation. (Year: 2002).*
Atsushi Yamahira, JP-2010285104-A, machine translation. (Year: 2010).*
Kraus Martin Josef, DE-102014225107-A1, machine translation. (Year: 2016).*

* cited by examiner (A)

(B)

(When a tire is flat)

HYBRID RUN-FLAT FOR MILITARY VEHICLE

BACKGROUND OF THE INVENTION

1. Field of the Invention

The present invention relates to a hybrid run-flat having an impact buffering structure for a military vehicle to enable the military vehicle to travel only with the run-flat mounted on the wheel while reducing an impact generated upon damage to the tire, even when the tire is separated from the wheel when the tire is damaged or punctured while the military vehicle is running.

2. Description of the Related Art

A mechanism for enabling a running even when a tire is flat includes a mechanism of using a tire capable of running while supporting the vehicle weight by improving a material and a structure of the tire to increase strength, and a mechanism of using a tire capable of running while supporting the vehicle by using a separate device installed inside the tire.

Tires, which are increased in thickness of a side wall to allow the vehicle to run with a support force due to the large thickness of the side wall upon the puncture, are mainly used as a run-flat tire. The above technology is pointed out as having a problem in that the effect is not satisfactory because a tire weight is increased by the thickness of the side wall, and thus a ride comfort is adversely affected. In addition, as the thickness of the side wall is increased, the high-speed endurance time is also shorter than before.

To solve the problems, schemes of using a device rather than a method for increasing the thickness of a sidewall of a tire have been proposed. As one of the schemes, there has been provided a run-flat device having a structure in which a sensor detecting a decrease in tire pressure transmits a signal to a separate cylinder damper system positioned on a wheel of a vehicle so that a cylinder moves outward to support the tire. However, the above device may exert a significant influence on fuel economy because the weight of the vehicle is increased due to the separate cylinder damper system, and may cause a problem on driving the vehicle because the shape of the tire cannot be famed suitably for a cornering driving other than a straight driving.

Accordingly, there are needs for developing a vehicular run-flat configured to prevent the above problems occurring in a military vehicle and enable the vehicle to run for a predetermined distance for the safety of a vehicle and an occupant even in the case of an external attack or sudden tire puncture.

(Patent Document 1) Korean Unexamined Patent Publication No. 10-2009-0047711 (Published on May 13, 2009)

SUMMARY OF THE INVENTION

The present invention is disclosed to solve the above-described problems. In run-flats in which three run-flats are coupled to each other to define a circle and a tire is mounted on an outer circumferential surface of a wheel, the present invention provides a hybrid run-flat for a military vehicle in which a buffer member formed of a material different from the run-flat is provided on an outer circumferential surface of the run-flat, and a groove filled with a lubricant is famed on an outer circumferential surface of the buffer member or a buffer space is separately formed inside the buffer member, so that not only the buffer member but also the buffer space therein may enable a smooth driving only with the run-flat when the tire is punctured and reduce an impact upon driving and upon the tire puncture, thereby implementing a buffer structure having an improved steering performance.

Other objects and advantages of the present invention will be described below, and will be appreciated by the embodiments of the present invention. In addition, the objects and advantages of the present invention may be realized by means and combinations disclosed in the claims.

To solve the above problems, the present invention provides a hybrid run-flat for a military vehicle, which includes: three run-flats 10 formed at both ends thereof with coupling steps 11 to be offset with each other, foiled on an inner circumferential surface thereof with an insertion groove 12, and coupled to each other to define a circle; a fixing pad 13 mounted in the insertion groove 12 to come into close contact with an outer circumferential surface of a wheel W of the military vehicle; and a buffer member 20 formed of a material different from the run-flat 10 and provided on an outer circumferential surface of the run-flat 10 to buffer an impact transferred to the military vehicle when a tire T on the outer circumferential surface of the run-flat 10 punctures and enable the military vehicle to run while the run-flat 10 functions as the tire T even when the tire T is damaged, in which a plurality of grooves 21 are spaced apart from each other on an outer circumferential surface of the buffer member in a longitudinal direction to prevent a damage due to friction by using a lubricant 22 filled in the groove 21.

As described above, according to the present invention, the buffer member is provided on the outer circumference of the run-flat, so that the vehicle can run without a tire when tire is punctured.

In addition, according to the present invention, a groove is foiled on an outer circumferential surface of the buffer member so as to inject a specially designed lubricant into the groove, so that a damage due to frictional heat between the run-flat and the tire can be reduced.

In addition, according to the present invention, a buffer space is formed inside the buffer member and the buffer space is configured to have shapes different from each other at left and right sides of the run-flat, so that an impact relief effect can be increased.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
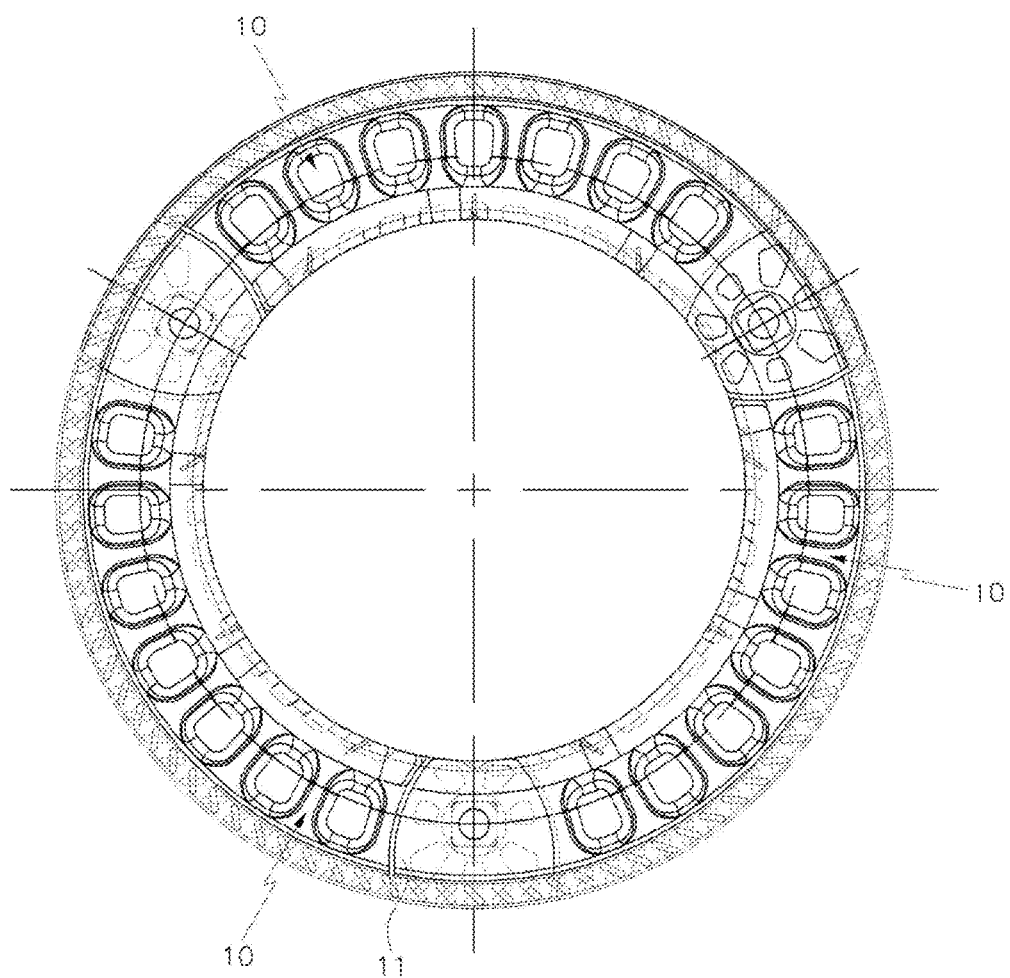
FIG. 1 is a view showing a hybrid run-flat having a buffer structure for a military vehicle according to one embodiment of the present invention.

Before various embodiments of the present invention are described in detail, it shall be apparent that the application thereof is not limited to the details of configurations and arrangements of elements described in the following detailed description or illustrated in the drawings. The present invention may be implemented and carried out in different embodiments and may be performed in various ways. In addition the expressions and predicates used herein with respect to term such as directions of a device or element (for example, "front", "back", "down", "top", "bottom", "left", "right", and "lateral") are used only to simplify the description of the present invention, and it does not represent or imply that the relevant device or element is simply required to have the particular direction. In addition, the terms such as "first" and "second" may be used in the specification and the appended claims for the purpose of description and are not intended to represent or imply any relative importance or intention.

The present invention has the following features to achieve the above-described objects.

Hereinafter, exemplary embodiments of the present invention will be described in detail with reference to the accompanying drawings. Above all, the terms and words used in the specification and claims of the present invention should not be construed as limited to a conventional or lexical meaning, and should be construed as the meanings and concepts based on the principle that "an inventor may define the concept of the term properly in order to describe the invention in the best way".

Accordingly, the embodiments described herein and the configurations shown in the drawings are merely preferred embodiments according to the present invention, and do not represent all of the technical ideas of the present invention. Therefore, it should be understood that various equivalents and modifications may be substituted therefor at the time of filing of the present application.

One embodiment according to the present invention is as follows.

A hybrid run-flat having an impact buffering structure for a military vehicle according to the present invention includes: three run-flats 10 formed at both ends thereof with coupling steps 11 to be offset with each other, formed on an inner circumferential surface thereof with an insertion groove 12, and coupled to each other to define a circle; a fixing pad 13 mounted in the insertion groove 12 to come into close contact with an outer circumferential surface of a wheel W the military vehicle; a buffer member 20 famed of a material different from the run-flat 10 and formed on an outer circumferential surface of the run-flat 10 to buffer an impact transferred to the military vehicle when a tire T on the outer circumferential surface of the run-flat 10 punctures and enable the military vehicle to run while the run-flat 10 functions as the tire T even when the tire T is damaged, in which a plurality of grooves 21 are spaced apart from each other on an outer circumferential surface thereof in a longitudinal direction to prevent a damage due to friction by using a lubricant 22 filled in the groove 21.

In addition, the buffer member 20 has a plurality of buffer spaces 30 spaced apart from each other and famed through an inside of the buffer member 20 in a width direction along a circumferential direction of the run-flat 10, thereby relieving the impact and facilitating the driving by using the buffer spaces 30 when the military vehicle runs only with the run-flats 10 due to the damage to the tire T.

In addition, the buffer spaces 30 are perforated in a diagonal shape so as to differently arranged to cross each other in an 'X' shape, in which the buffer space 30 at one side of the run-flat 10 about the coupling step 11 is formed in a clockwise rotation direction of the run-flat 10, and the buffer space 30 at the other side is famed in a counterclockwise rotation direction of the run-flat 10, thereby functioning to relieve an impact in the clockwise and counterclockwise rotation directions onto the run-flat 10.

In addition, the three run-flats 10 are coupled to each other while the coupling steps 11 are engaged with each other, in which the coupling steps 11 are bolting-coupled to each other through a bolt and a nut, or a pipe and both ends are fixedly coupled by a snap ring 40.

Figure 2:
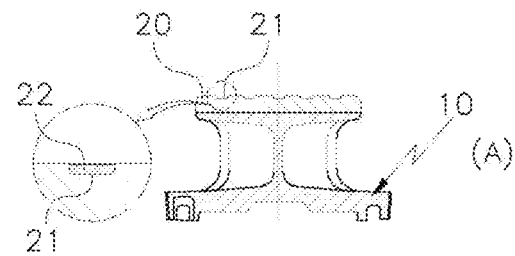
FIG. 2 is a view showing one of run-flats according to one embodiment of the present invention.
Figure 2:
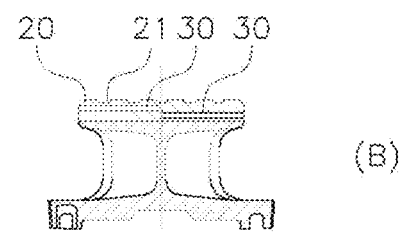
Figure 2:
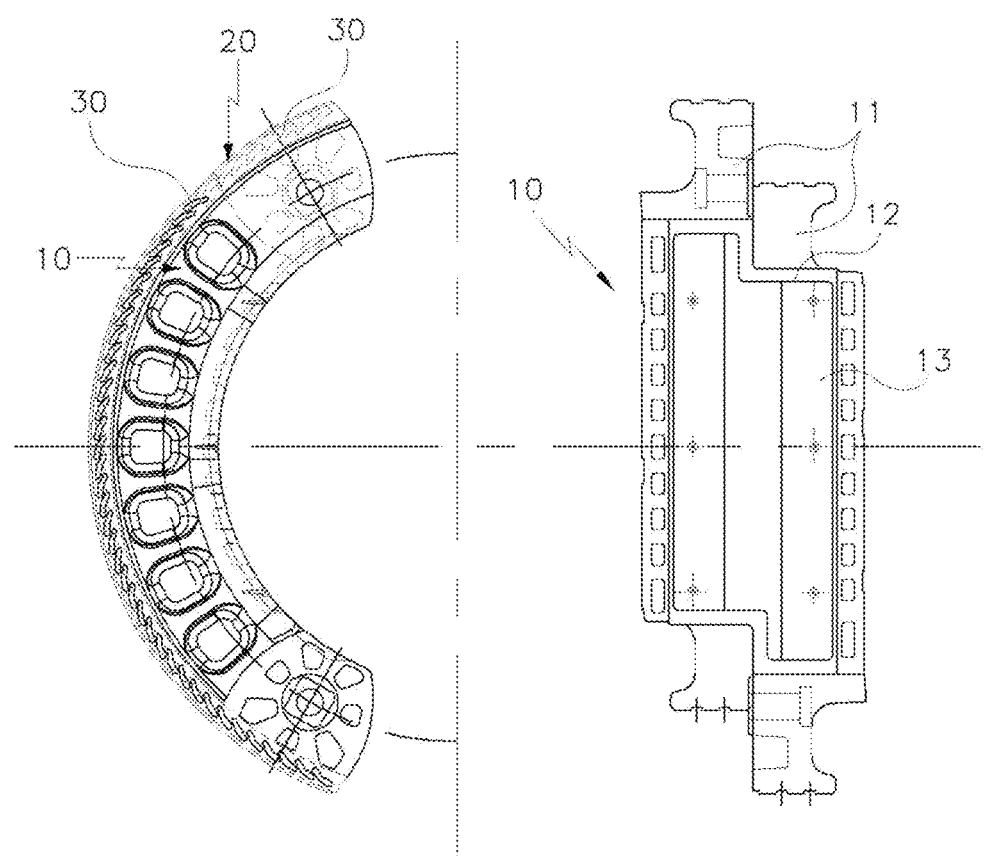
Figure 3:
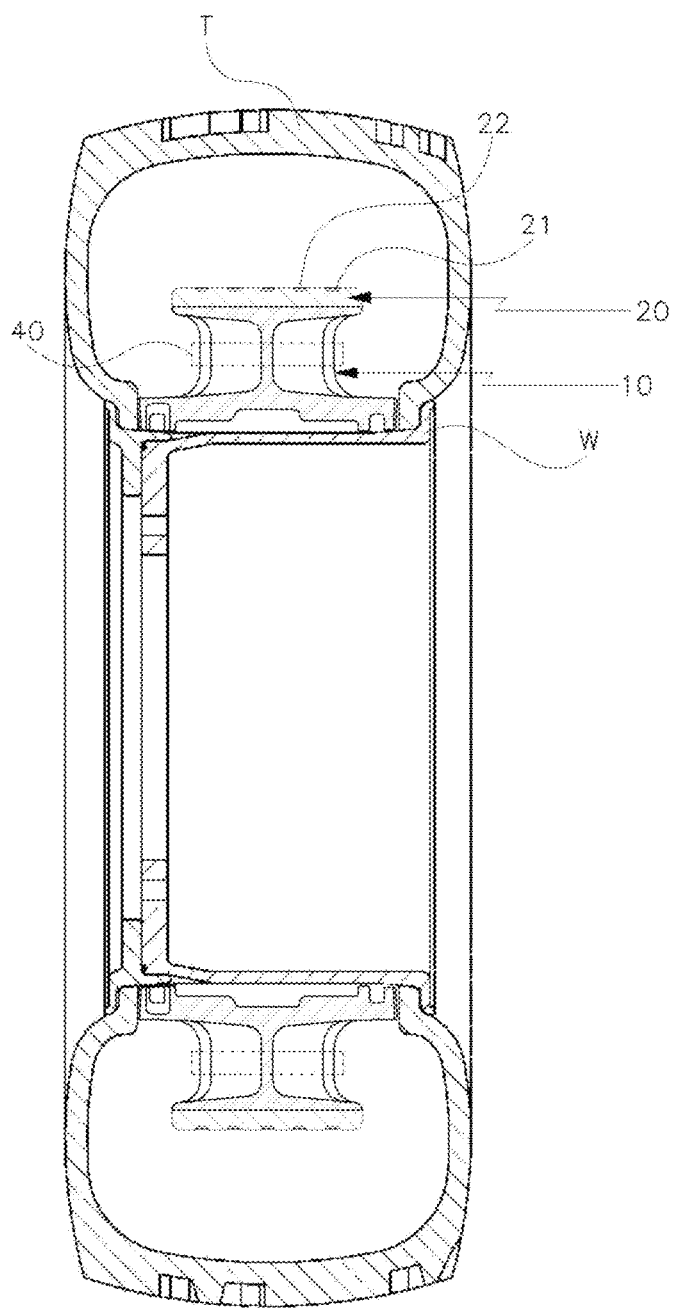
FIG. 3 is a view showing a buffer member according to a first embodiment of the present invention.
Figure 4:
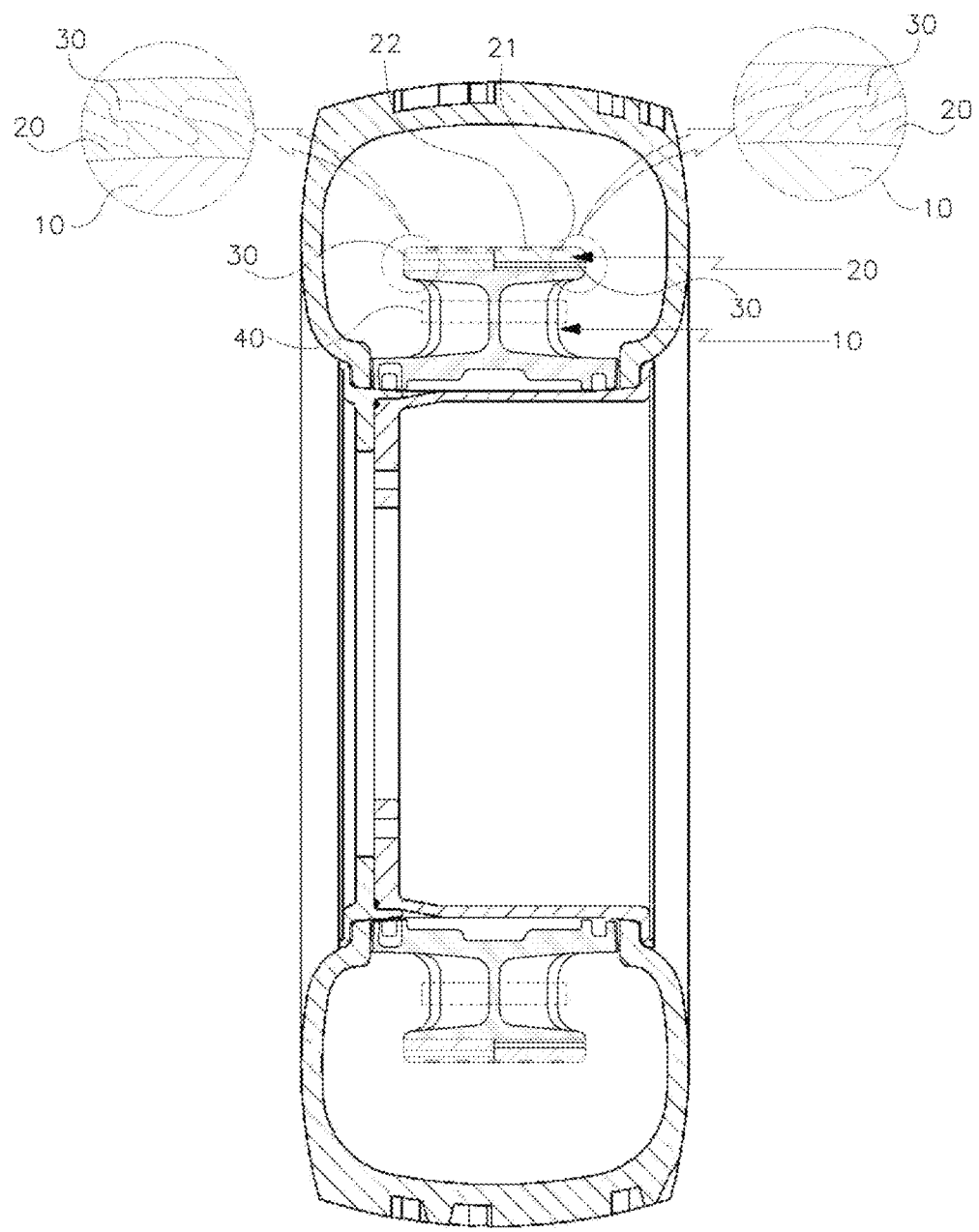
FIG. 4 is a view showing a buffer member according to a second embodiment of the present invention.
Figure 5:
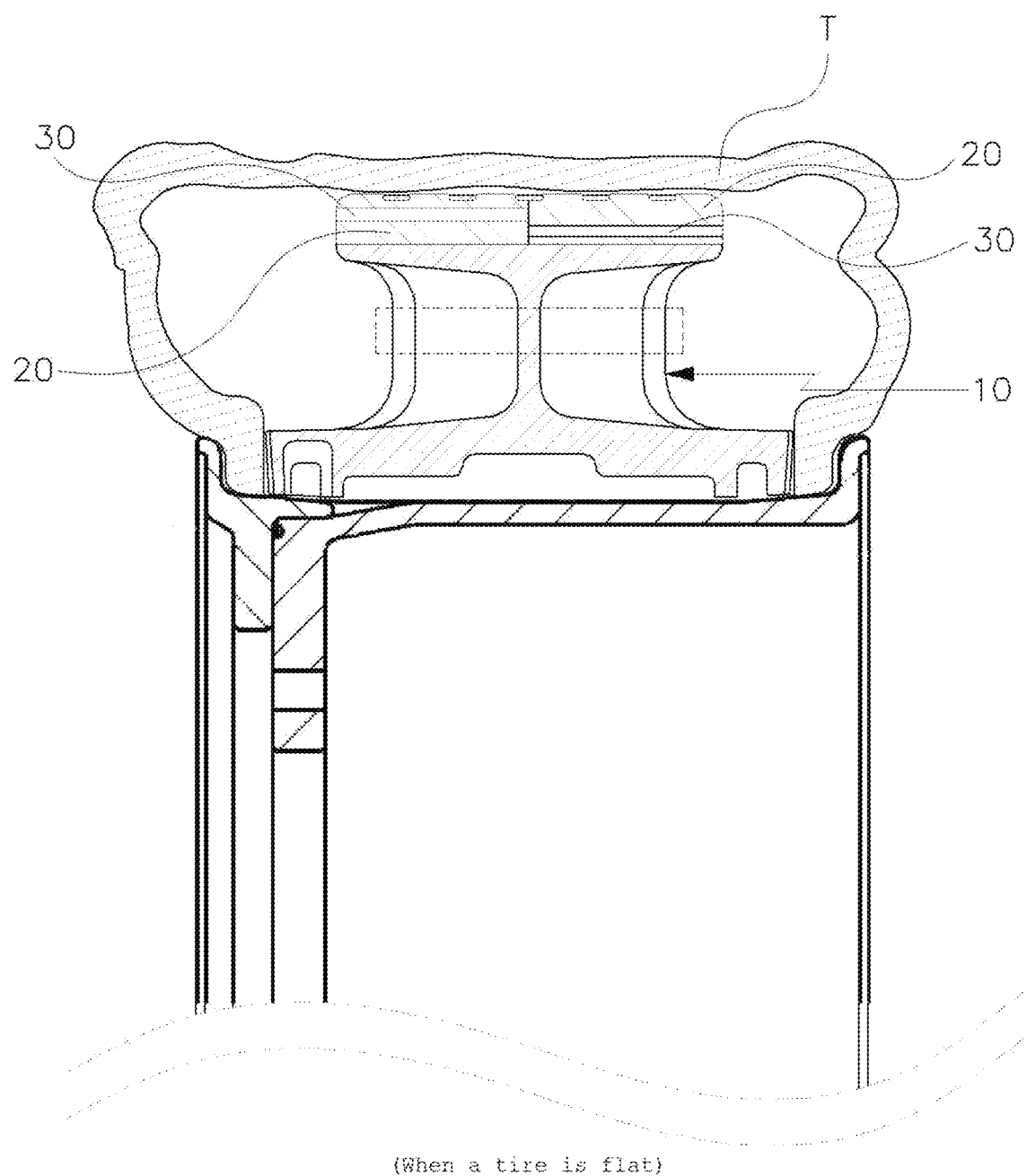
FIG. 5 is a view showing a state in which a run-flat serves as a tire when a tire is flat according to one embodiment.

Hereinafter, the hybrid run-flat having a buffering structure for a military vehicle according to an exemplary embodiment of the present invention will be described in detail with reference to FIGS. 1 to 5.

The hybrid run-flat having a buffering structure for a military vehicle according to the present invention includes a run-flat 10, a fixing pad 13, and a buffer member 20.

The run-flat 10 is configured to define a circle when three run-flats 10 are fastened to each other, in which each of the run-flats 10 is formed at both ends thereof with coupling steps 11 to be offset with each other, and famed on an inner circumferential surface thereof with an insertion groove 12. The coupling steps 11 of the three run-flats 10 are coupled by bolting each other with a bolt and a nut. However, according to another embodiment of a user, the coupling steps 11 between the run-flats 10 may be fixedly fastened to each other by a circular or oval snap ring 40 tightening while surrounding an outer circumferential surface of the coupling step 11 (a pipe and the both ends are fixedly coupled by the snap ring 40).

A fixing pad 13 is inserted and mounted in the insertion groove 12 of the run-flat 10, and the fixing pad 13 configured to protrude from the inner circumferential surface of the run-flat 10 at a predetermined height to come into close contact with an outer circumferential surface of a wheel W of the military vehicle.

The above structure of the run-flat 10 is a generally known technique, and the detailed description will be omitted.

The buffer members 20 are formed of a material (such as rubber) different from nylon serving as a material of the above-described run-flat 10, and are provided to have a ring shape on the outer circumferential surfaces of the run-flats 10.

The buffer member 20 is configured to reduce the impact transferred to the military vehicle upon the puncture and driving in the punctured state when the tire T on the outer circumference of the run-flat 10 is damaged or punctured, and the run-flat 10 itself is configured to function as the tire T, thereby enabling the military vehicle to run.

The outer circumferential surface of the buffer member 20 is configured to have a wave shape in the width direction, in which a plurality of grooves 21 are spaced apart from each other at equal intervals in the longitudinal direction, and lubricating oil such as grease or various lubricants 22 specially suitable for use environments are injected into the grooves 21, so that a damage caused by friction may be prevented.

Further, according to embodiments of the user, a plurality of buffer spaces 30 formed through the inside of the buffer member in the width direction are spaced apart from each other in the buffer member 20 along the circumferential direction of the ring-shaped run-flats 10, so that an empty space is formed inside the buffer member 20.

Accordingly, when the military vehicle runs only by the run-flats 10 due to the damage to the tire T, the buffer spaces 30 may increase the impact relief effect.

In addition, the buffer spaces 30 are perforated in a diagonal shape, in which the formation direction of the buffer space 30 at one side of the run-flat 10 and the formation direction of the buffer space 30 at the other side may be defined in directions opposite to each other with respect to the coupling step 11. In other words, the buffer spaces 30 may be famed differently in an 'X' shape to cross each other, in which the buffer space 30 perforated in the width direction from a left side of the run-flat 10 to a center of the run-flat 10 may be perforated in a diagonal shape, such as a backslash (\), toward the rotation direction of the run-flat 10, and the buffer space 30 perforated in the width direction from a right side of the run-flat 10 to the center of the run-flat 10 may be perforated in a diagonal shape, such as a forward slash (/), toward the rotation direction of the run-flat 10.

The above configuration allows the buffer spaces 30 to have a buffering effect and an impact reducing effect with respect to any rotation direction regardless of the rotation direction (clockwise or counterclockwise) of the run-flat 10 (or the tire T).

As described above, although the present invention has been described by the limited embodiments and drawings, the present invention is not limited thereto, and it will be apparent that a person having ordinary skill in the art may carry out various deformations and modifications within the scope without departing from the idea of the present invention, the following claims and equivalents thereof.

What is claimed is:

1. A hybrid run-flat having a buffering structure for a military vehicle, the hybrid run-flat comprising:
   three run-flats each formed at opposite ends thereof with coupling steps which are offset with each other, each formed on an inner circumferential surface thereof with an insertion groove, and coupled to each other to form a circle;
   a fixing pad mounted in the insertion groove to come into close contact with an outer circumferential surface of a wheel of the military vehicle; and
   a buffer member formed of a material different from the run-flat and formed on an outer circumferential surface of the run-flat to buffer an impact transferred to the military vehicle when a tire on the outer circumferential surface of the run-flat is flat and enable the military vehicle to run due to the run-flat serving as the tire even when the tire is damaged, in which a plurality of grooves are formed on an outer circumferential surface of the buffer member in a longitudinal direction while being spaced apart from each other, so that a lubricant filled in the groove prevents a damage due to friction, wherein
   the buffer member is formed with a plurality of buffer spaces formed through an inside of the buffer member in a width direction along a circumferential direction of the run-flats while being spaced apart from each other and the plurality of buffer spaces are comprised of air, thereby relieving the impact and facilitating the driving by using the buffer spaces when the military vehicle runs only with the run-flats due to the damage to the tire, and
   the buffer spaces are perforated to have diagonal shapes and arranged to cross each other in an "X" shape, in which the buffer spaces at one side of the run-flat about the coupling step are formed in a clockwise rotation direction of the run-flat, and the buffer spaces at an opposite side are formed in a counterclockwise rotation direction of the run-flat, thereby relieving an impact onto the run-flat in clockwise and counterclockwise rotation directions.

2. The hybrid run-flat of claim 1, wherein the three run-flats are coupled to each other as the coupling steps are engaged with each other, in which the coupling steps are coupled to each other through a bolt and a nut, or through a snap ring that fixedly couples a pipe and opposite ends of the coupling steps.

* * * * *